(12) United States Patent
Ben-Yehuda et al.

(10) Patent No.: US 10,713,162 B1
(45) Date of Patent: Jul. 14, 2020

(54) SYSTEM AND METHOD FOR COMPUTER DATA GARBAGE COLLECTION ACCELERATION USING PEER TO PEER DATA TRANSFERS

(71) Applicant: LIGHTBITS LABS LTD., Kfar Saba (IL)

(72) Inventors: Shmuel Ben-Yehuda, Haifa (IL); Ofir Efrati, Even Yehuda (IL); Roy Geron, Beit Izchaq (IL); Abel Alkon Gordon, Haifa (IL); Sagi Grimberg, Kfar Saba (IL); Eran Kirzner, Moshav Elishama (IL); Ziv Tishel, Kiryat Ono (IL); Maor Vanmak, Magal (IL); Ofer Hayut, Rosh Pina (IL)

(73) Assignee: Lightbits Labs Ltd., Kfar Saba (IL)

( * ) Notice: Subject to any disclaimer, the term of this patent is extended or adjusted under 35 U.S.C. 154(b) by 187 days.

(21) Appl. No.: 15/963,131

(22) Filed: Apr. 26, 2018

(51) Int. Cl.
  *G06F 12/02* (2006.01)
  *G06F 12/10* (2016.01)

(52) U.S. Cl.
  CPC ......... *G06F 12/0269* (2013.01); *G06F 12/10* (2013.01); *G06F 2212/1044* (2013.01); *G06F 2212/657* (2013.01)

(58) Field of Classification Search
  None
  See application file for complete search history.

(56) References Cited

U.S. PATENT DOCUMENTS

| 10,482,009 | B1* | 11/2019 | Sabol | G06F 12/0246 |
| 2014/0215129 | A1* | 7/2014 | Kuzmin | G06F 12/0246 711/103 |
| 2018/0336129 | A1* | 11/2018 | Hutchison | G06F 12/0269 |

\* cited by examiner

Primary Examiner — Denise Tran
(74) Attorney, Agent, or Firm — Pearl Cohen Zedek Latzer Baratz LLP

(57) ABSTRACT

A method and a system for accelerating computer data garbage collection (GC) on a non-volatile memory (NVM) computer storage device may include: monitoring, by a processor, a data validity parameter of at least one physical write unit (PWU), where the PWU may include a plurality of physical data pages of the NVM device; sending at least one GC command from the processor to an accelerator associated with the NVM device, based on the monitored data validity parameter; copying, by the accelerator, a plurality of data-objects stored on at least one first PWU, to a read address space comprised within the accelerator; copying valid data-objects from the read address space to a write address space comprised within the accelerator until the amount of data in the write address space exceeds a predefined threshold; and storing, by the accelerator, the data content in at least one second PWU in the NVM media.

27 Claims, 8 Drawing Sheets

SYSTEM AND METHOD FOR COMPUTER DATA GARBAGE COLLECTION ACCELERATION USING PEER TO PEER DATA TRANSFERS

FIELD OF THE INVENTION

The present invention relates generally to non-volatile computer storage systems. More specifically, the present invention relates to using address virtualization in non-volatile storage systems.

BACKGROUND OF THE INVENTION

Many computer data storage systems have an integrated key component, referred to as a garbage collector, which is configured to track the validity of data written to the underlying non-volatile memory (NVM) storage media, such as hard-disk drives (HDDs) and solid-state drives (SSDs), and overwrite data that is no longer valid with new, valid data.

For example, when a host computer initially stores a data-object on an NVM storage device, the data-object is marked as valid. When the data-object is updated or deleted from memory by a user or an application being executed on the host computer, the originally stored data-object becomes invalid and the space it occupies needs to be "garbage collected".

Most storage media units, including HDDs and SSDs, work in fixed block sizes, meaning an entire block of data needs to be written every time. Many storage systems impose an additional, larger block size. These larger blocks, composed of many media-level blocks, are again written in their entirety, and are may be referred to as "write units" (WUs).

When performing a process of garbage collection from WUs, parts of the WU are usually valid, and parts are invalid. The valid parts need to be copied and aggregated into a new WU and the invalid parts need to be discarded.

At its simplest, garbage collection can be described as the following process: (a) a central processing unit (CPU) reads some WUs that are partly valid and partly stale from the underlying data-storage media into memory; (b) the CPU locates the parts that are marked as valid within these WUs, and copies them into a new WU in a memory module associated with the CPU; (c) the CPU writes the new WU into the underlying media units; and (d) the CPU updates the metadata related to the garbage collection (GC) operation, e.g. updating the validity and location of stored data-objects in the NVM storage media.

As known to persons having ordinary skills in the art, the process elaborated above may consume considerable resources (e.g. CPU computation cycles and memory allocation) of the host computer due to the copying of data-objects from the underlying media into a memory space associated with the CPU, identifying valid data-objects, and copying the data from the CPU memory onto the underlying NVM media.

A system and a method for garbage collection that does not require CPU and memory resources from the host computer is therefore required.

SUMMARY

Embodiments of the invention include accelerating garbage collection on an NVM computer storage device. An embodiment may include: (a) monitoring, by a processor, a data validity parameter of at least one physical WU (PWU), where the PWU may include a plurality of physical data pages of the NVM device; (b) sending at least one GC command from the processor to an accelerator associated with the NVM device, based on the monitored data validity parameter; (c) copying, by the accelerator, a plurality of data-objects stored on at least one first PWU, to a read address space included within the accelerator; (d) copying valid data-objects from the read address space to a write address space included within the accelerator until the amount of data in the write address space exceeds a predefined threshold; and (e) storing, by the accelerator, the data content in at least one second PWU in the NVM media.

According to some embodiments, the accelerator may be associated with a plurality of NVM devices, and if an occupancy of a first PWU associated with a first NVM device is below a threshold, the accelerator may copy valid data content from the first PWU to a second PWU that is associated with a second NVM device, thus performing GC across one or more NVM devices.

Embodiments of the invention include accelerating garbage collection on an NVM computer storage media associated with a host computer and an accelerator, including for example: (a) monitoring, by the host computer at least one parameter of data validity in relation to at least one PWU, wherein each PWU includes a plurality of contiguous physical data pages of the NVM media; (b) sending at least one GC command from the host computer to the accelerator according to the at least one monitored parameter; and (c) performing garbage collection (GC) by the accelerator on the at least one PWU according to the at least one GC command of the host computer.

An embodiment of the method may include: (a) defining, by the host computer, a logical address space, including at least one logical WUs (LWUs), wherein each LWU refers to a respective PWU; (b) receiving, by the host computer, at least one data-object to be stored on the NVM media; (c) mapping by the host computer, the at least one data-object to a logical address space within an LWU; (d) repeating the receiving of data-objects and mapping thereof into the LWU until the LWU cannot accommodate an additional data-object; and (e) storing all data-objects that are mapped to the LWU in a first PWU referred by the LWU, on the NVM media.

An embodiment may include monitoring write-access operations of data-objects by the host computer to the NVM media by a metadata module included within the host computer; and marking, by the metadata module, a mapping of at least one data-object to an address within an LWU as invalid based on at least one of: a data-object overwrite operation (e.g.: changing a value of a stored data-object by an application), and a data-object delete operation (e.g.: purging, or deallocating a data-object from memory by an application).

An embodiment may include: (a) obtaining, by a GC module included within the host computer, a parameter of data validity of at least one data-object mapped to a first LWU of the logical address space, according to the marking of the metadata module; (b) maintaining, by the GC module, a metadata table, associating the parameter of data validity to the at least one data-object; (c) analyzing the metadata table by the GC module, to extract a parameter of occupancy relating to the at least one first LWU.

An embodiment may include: performing a sequential scan of all the LWUs in logical address space by the GC module, from the first LWU to the last LWU, and wrapping back to the first LWU in a cyclic pattern and obtaining a parameter of data validity of at least one data-object in at least one scanned LWU.

An embodiment may include: if the occupancy of the at least one first LWU exceeds a first predefined threshold, then marking the WU as occupied by the GC module and preventing writing to pages of the at least one first LWU.

An embodiment may include: if the occupancy of the at least one first LWU does not exceed the first predefined threshold, then sending a GC command from the GC module to the accelerator, and selectively causing the accelerator to perform a GC process according to the GC command.

According to some embodiments, performing a GC process by the accelerator includes at least one of: (a) reading data content of at least one first PWU from the NVM media to a read address space included within the accelerator, wherein the data content may contain data of valid and invalid pages; (b) copying data content of valid pages from the read address space to a write address space included within the accelerator; (c) repeating the reading and copying of data content into the write address space until the amount of data content exceeds a second predefined threshold; (d) storing, by the accelerator, the data content in at least one second PWU in the NVM media; and (e) marking, by the accelerator, at least one first LWU that refers to the at least one PWU as free for new storage.

According to some embodiments, the data-objects are mapped by the host computer into at least one, fixed-sized logical address space within the first LWU, referring to at least one respective, fixed-sized physical address space in a PWU, wherein the at least one second address space includes a plurality of contiguous data-pages of the NVM media.

According to some embodiments, a method may include: accessing data-objects in the logical address space by a processor of the host computer, by providing an address including a combination of a namespace and an offset to an LWU address within the namespace.

According to some embodiments, the data-objects are mapped by the host computer into at least one, variable-sized logical address space within the first LWU, referring to at least one respective, variable-sized physical address space in a PWU, wherein the at least one physical address space includes a plurality of contiguous data-pages of the NVM media.

An embodiment of the method may include accessing data-objects in the logical address space by a processor of the host computer, by a key/value access protocol.

Embodiments of the invention disclose a system for performing garbage collection on an NVM computer storage media. An embodiment may include a host computer and an accelerator associated with the NVM media. The host computer may be configured to: (a) monitor at least one parameter of data validity in relation to at least one PWU, where each PWU includes a plurality of contiguous physical data pages of the NVM media; and (b) send at least one GC command to the accelerator according to the at least one monitored parameter. The accelerator may be configured to perform GC on the at least one PWU according to the at least one GC command of the host computer.

According to some embodiments, the host computer may be configured to: (a) define a logical address space, including at least one LWU, wherein each LWU refers to a respective PWU; (b) receive at least one data-object to be stored on the NVM media; (c) map the at least one data-object to a logical address space within a first LWU; (d) repeat the receiving of data-objects and mapping thereof into the first LWU until the first LWU cannot accommodate an additional data-object; and (e) store all data-objects that are mapped to the first LWU in a first PWU referred by the first LWU, on the NVM media.

According to some embodiments, the host computer may include a metadata module, configured to monitor write-access operations of data-objects by the host computer to the NVM media; and mark a mapping of at least one data-object to an address within an LWU as invalid based on at least one of a data-object overwrite operation and a data-object delete operation.

According to some embodiments, the host computer may include a GC module, configured to: (a) obtain a parameter of data validity of at least one data-object mapped to a first LWU of the logical address space, according to the marking of the metadata module; (b) maintain a metadata table, associating the parameter of data validity with the at least one data-object; and (c) analyze the metadata table, to extract a parameter of occupancy relating to the at least one first LWU.

According to some embodiments, the GC module may be configured to obtain a parameter of data validity of at least one data-object by performing a sequential scan of all the LWUs in the logical address space, from the first LWU to the last LWU, and wrap back to the first LWU in a cyclic pattern.

According to some embodiments, if the occupancy of the at least one first LWU exceeds a first predefined threshold, then the GC module may mark the LWU as occupied and may prevent writing to pages of the at least one first LWU.

According to some embodiments, if the occupancy of the at least one first LWU does not exceed the first predefined threshold, the GC module may cause the accelerator to perform a GC process, as explained herein.

The accelerator may include a read address space, and a write address space, and performing a GC process by the accelerator may include at least one of: (a) reading data content of at least one first PWU from the NVM media to the read address space, wherein the data content may contain data of valid and invalid pages; (b) copying data content of valid pages from the read address space to the write address space; (c) repeating the reading and copying of data content into the write address space until the amount of data content exceeds a second predefined threshold; (d) storing the data content in at least one second PWU in the NVM media; and (e) marking at least one first LWU that refers to the at least one PWU as free for new storage.

According to some embodiments, the NVM media may include a plurality of NVM devices, where each NVM device is associated with at least one port. An embodiment of the system may include a port switch, configured to route data between an embodiment of the system and at least one port of at least one NVM device of the plurality of NVM devices.

According to some embodiments, if the occupancy of a first PWU associated with a first NVM device is below a threshold, GC module may order accelerator to copy valid data content from the first PWU to a second PWU that is associated with a second NVM device, thus performing GC across one or more NVM devices.

According to some embodiments, a processor of the host computer may be configured to access data-objects in the logical address space by providing an address including a combination of a namespace and an offset to an LWU address within the namespace. Alternately, the processor of the host computer may be configured to access data-objects within the logical address space by a key/value access protocol.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
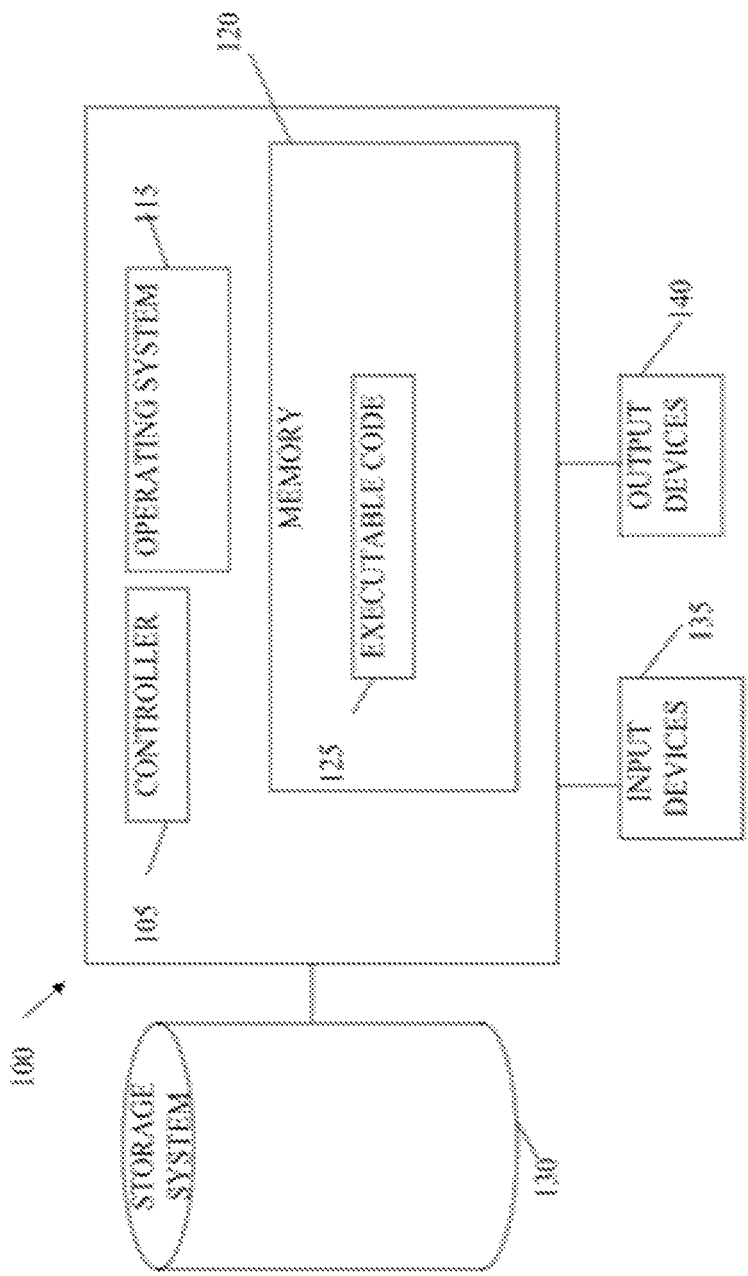
FIG. 1 is a block diagram depicting a computing device, which may be included within a system for accelerating GC, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for accelerating garbage collection on NVM storage media, using peer-to-peer data transfers between NVM storage media units, without requiring computational resources from a host computer.

The terms "NVM storage media" and "NVM storage device" are used interchangeably within this document, when referring to single elements for non-volatile storage of data (e.g. a flash memory, an SSD drive, etc.). An embodiment may be configured to accelerate garbage collection from a plurality NVM storage devices. In this context, the term "NVM storage media" refers to an element for non-volatile storage of data including a plurality of NVM storage devices.

Reference is now made to FIG. 1, which is a block diagram depicting a computing device 100, which may be included within an embodiment of a system for accelerating GC, according to some embodiments. Computing device 100 may include a controller 105 that may be, for example, a central processing unit processor (CPU), a chip or any suitable computing or computational device, an operating system 115, a memory 120, executable code 125, a storage system 130 that may include a model 136, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120. Model 136 may be, or may include, a timing model that includes timing properties of messages, or expected behavior of messages, as described herein. As further described, model 136 may be, or may include, a content model that may include content attributes or properties of messages, or expected content related behavior of messages, as described herein.

Input devices 135 may be or may include any suitable input devices, components or systems, e.g., a detachable keyboard or keypad, a mouse and the like. Output devices 140 may include one or more (possibly detachable) displays or monitors, speakers and/or any other suitable output devices. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units.

According to some embodiments, a system may include a logical address space, including a plurality of LWUs, where each LWU refers to, or is associated with, a respective PWU, including a contiguous, fixed-sized portion of a plurality of data-pages on the NVM storage media. In some embodiments, the logical address space may be stored in a memory of the host computer (e.g. element 120 of FIG. 1).

An embodiment of the system may be configured to receive at least one data-object from a host computer, to be stored on the NVM device, and may map the data-object to a logical address space within an LWU. Mapping of the data-object may include, for example, copying a content of the at least one data-object, or a pointer thereto into and address space within the LWU.

According to some embodiments, the LWU may include, or be associated with at least one data validity metadata parameter, which in turn may be associated with at least one data-object. The mapping of a data-object to a logical address space within an LWU may be labelled or marked as valid, or invalid according to the data validity parameter.

For example, when an application (e.g. a software application executed on a host device) assigns a value to a data-object for the first time, an embodiment may map the data-object to a logical address space within a first LWU, by copying the data-object to the first LWU or by referring to it by a pointer in the first LWU. An embodiment may mark the mapping of the data-object to the address space as valid by a respective data validity parameter. An embodiment may then store the data-object within a first PWU of the NVM media, that is referred by the first LWU.

Following an overwrite of the value of the data-object by the application, an embodiment may map the data-object to a logical address space within a second LWU and store the data-object within a second PWU of the NVM media. An embodiment of the system may label or mark the mapping of the data-object to the logical address space within the first LWU as invalid (e.g. referring to invalidated data, stored on the first PWU) and requiring garbage collection, as explained herein.

This receiving of data-objects and mapping thereof onto an LWU may be repeated until the LWU cannot accommodate an additional data-object (e.g. if the size of an additional data-object exceeds the remaining space within the LWU). An embodiment of the system may store the content of the full LWU (e.g. store the content of all data-objects that have been mapped to the full LWU) in a PWU that is referred to by the LWU, on the NVM device.

An embodiment of the system may include a metadata module, configured to monitor write-access of the host computer to the NVM storage media, and identify at least one condition in which a stored data-object may be overwritten (e.g., updated by an application that is executed by the host computer) or deleted (e.g., purged from the host computer's internal memory). The metadata module may be configured to attributing a parameter of data validity to each data-object that is mapped to an LWU within the logical address space.

An embodiment may include a GC module, configured to perform a sequential or other scan through the logical address space, from the first LWU to the last, and back to the first LWU in a cyclic order (e.g., LWU-1→LWU-2→LWU-3→ . . . →LWU-N→LWU-1 . . . ), to identify LWUs that have a low level of occupancy. For example, the GC module may label or mark LWUs in which the number of valid data-pages in relation to the LWU's size is beneath a predefined threshold. The GC module may invoke a process of garbage collection on at least one PWU, based on the occupancy of at least one respective LWU.

According to some embodiments, the GC module may be implemented as a software process and may be executed by a processor (e.g. element 105 of FIG. 1) of the host computer.

For example, if LWU-a, LWU-b and LWU-c of the logical address space respectively represent PWU-x, PWU-y and PWU-z of the physical address space, and LWU-a, LWU-b are of low occupancy (e.g. PWU-x, PWU-y have a large number of invalid data-pages storing deleted data-objects), and LWU-c is empty (e.g. PWU-z has been erased and is ready to be written to) then a GC module may invoke, e.g. cause the execution of, a GC process, that may: (a) map valid data-objects of LWU-a and LWU-b into LWU-c; (b) aggregate valid data pages from\PWU-x and PWU-y into PWU-z; (c) erase physical write units PWU-x and PWU-y;

and (d) update the validity status of data objects within LWUs of the logical address space.

An embodiment of the system may include an accelerator module, configured to receive a GC command from the GC module, and perform GC on at least one PWU according to the GC command of the GC module.

The term "Physical write unit" (PWU) as used herein refers to at least one portion of a plurality of contiguous physical data pages of an NVM storage media, whereupon at least one data-object may be stored.

The term "Logical write unit" (LWU) as used herein refers to at least one element of a logical address space, that may have at least one data-object mapped thereto and may refer to a respective PWU in an NVM storage media.

According to some embodiments, the accelerator module may include a read address space and a write address space, that are both separate from the host's CPU and memory space. The accelerator module may be configured to: (a) read the content of at least one first PWU to the read address space; (b) copy the content of valid data-pages from the read address space to the write address space; and (c) store the content of the write address space in at least one second PWU of the NVM storage media.

Figure 2:
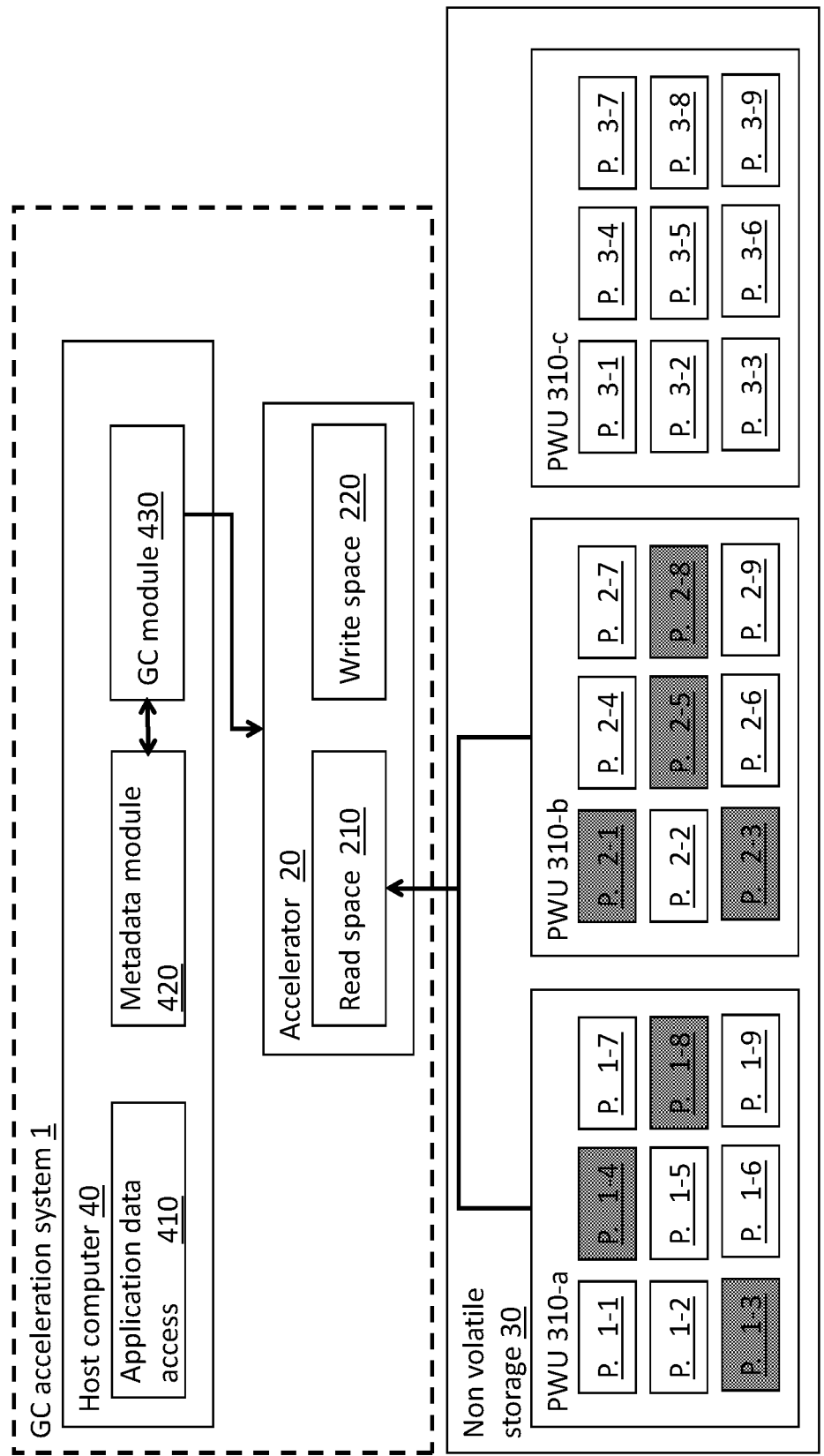
FIG. 2 is a block diagram, depicting reading of data-objects from PWUs of an NVM storage media according to some embodiments.
Figure 3:
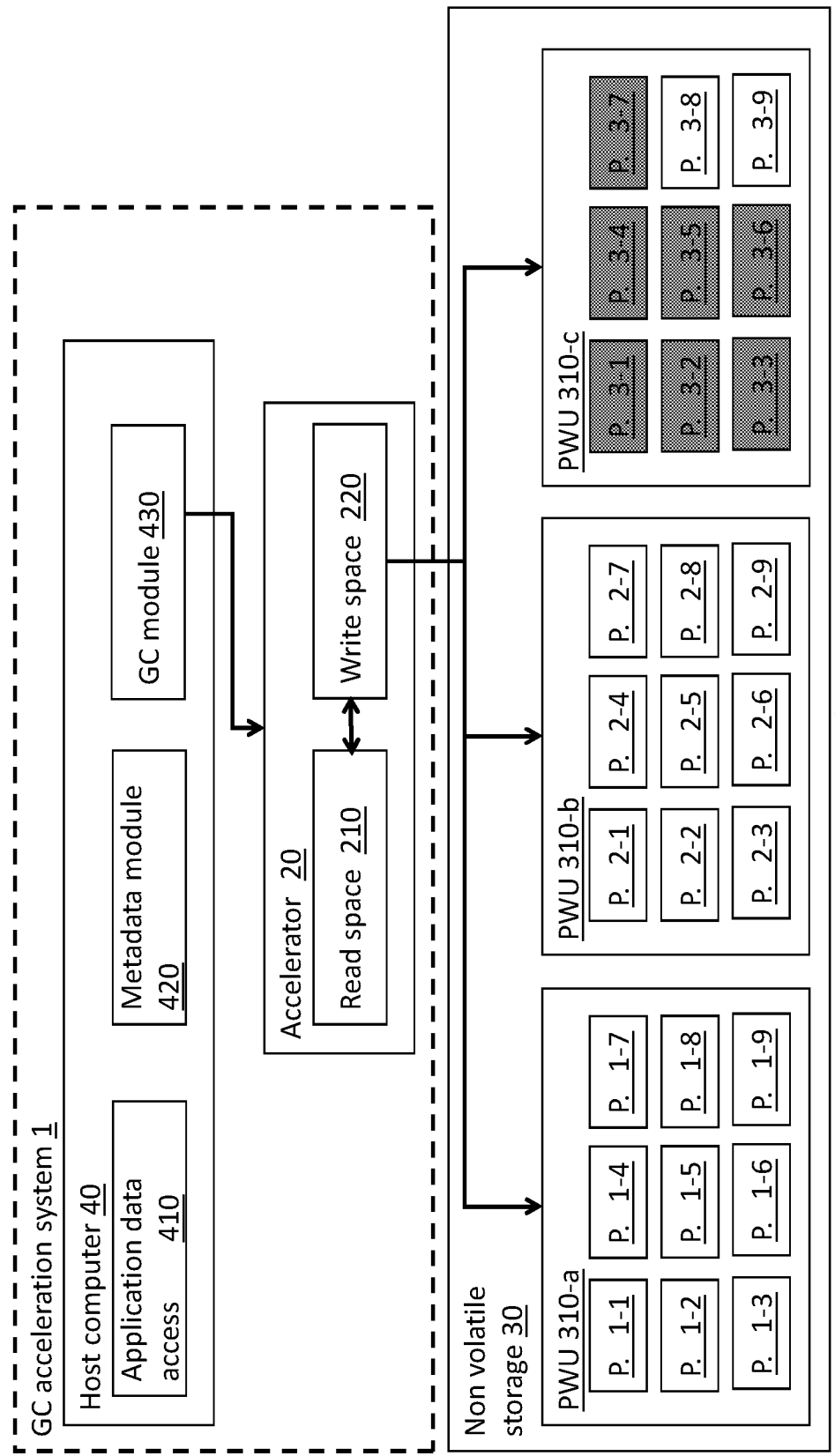
FIG. 3 is a block diagram, depicting storing data-objects on PWUs of the NVM storage media according to some embodiments.

Reference is now made to FIG. 2 and FIG. 3, which are block diagrams, depicting the function and architecture of a system for accelerating GC on an NVM computer storage media 30, according to some embodiments.

System 1 may include a host computer 40, which may be implemented as computerized device (e.g. element 100 of FIG. 1) and may include at least one processor (e.g. element 105 of FIG. 1). Host computer 40 may be communicatively connected (e.g. via a computer network) with at least one NVM storage device 30. For example, host computer 40 may be a server, configured to query data from a database, which resides on NVM 30, located in a data center.

System 1 may include an accelerator 20, associated with at least one NVM device 30, and communicatively connected with host computer 40. For example, accelerator 20 may be connected to host computer 40 via a computer network and attached to NVM 30 through a Peripheral Component Interconnect Express (PCIE) bus.

According to some embodiments, accelerator 20 may be implemented as a computational device (e.g. element 100 of FIG. 1), separate from host computer 10 and may include a CPU, software, hardware, firmware or any combination thereof. In these embodiments, accelerator 20 may not consume computational resources (e.g. processor cycles, memory allocation) of host computer 40.

In alternate embodiments, the operation of accelerator 20 may be implemented as a software module and may be executed (e.g. as a software process) by one or more processor (e.g. element 105 of FIG. 1) of host computer 40.

According to some embodiments, system 1 may include at least one of a metadata module 120, and a GC module 430. Each of metadata module 120 and GC module 430 may be implemented as a software module and may be executed (e.g. as a software process) by one or more processors (e.g. element 105 of FIG. 1) of host computer 40. In alternate embodiments, each of metadata module 120 and GC module 430 may be implemented on a computational device (e.g. element 100 of FIG. 1), separate from host computer 10, and may include software, hardware, firmware or any combination thereof. For example, GC module 430 may be implemented as a hardware module (e.g. as a chip including a proprietary processor, or as an add-on printed circuit board (PCB) installed in host computer 40).

Metadata module 120 may be configured to monitor write-access operations of data-objects by host computer 40 (e.g. by an application running on host computer 40) to NVM storage media 30 and attribute a parameter of data validity to each such data-object. For example, metadata module 120 may mark or record a mapping of at least one data-object to an address within, or included in, an LWU as invalid if the data-object is overwritten. In another example, metadata module 120 may mark or record a mapping of at least one data-object to an address within an LWU as invalid if the data-object is deleted.

GC module 430 may be configured to receive at least one parameter of data validity in relation to at least one data-object stored on at least one PWU (e.g.: 310-*a*, 310-*b* and 310-*c*) of NVM storage media 30 from metadata module 120 and maintain the data validity information in a metadata table 434.

According to some embodiments, GC module may be configured to send at least one GC command to accelerator 20, to perform GC on at least one PWU (e.g.: 310-*a*, 310-*b*) of underlying NVM storage media 30, according to the at least one monitored parameter, as explained herein. In embodiments where GC module 430 is implemented as part of host computer 40 (e.g. executed as a software process by one or more processors of host computer 40), accelerator 20 may be configured to perform GC on the at least one PWU (e.g.: 310-*a*, 310-*b*) of NVM storage media 30 according to the GC command of the host computer 40.

Accelerator 20 may include a read address space 210, and a write address space 220, that are separate from host computer's 40 memory. As shown in FIG. 2, accelerator 20 may initiate a GC process, after receiving a GC command from the GC module, by reading data content of at least one first PWU (e.g.: 310-*a*, 310-*b*) from NVM storage media 30 to the read address space 210. The read data content may contain data of valid and invalid pages (e.g. storage of new data-objects and overwritten data objects respectively, within the NVM). For example, accelerator 20 may copy a plurality of data-objects stored on at least one first PWU (e.g.: 310-*a*, 310-*b*) from NVM storage media 30 to the read address space 210. The copied data-objects may include valid and invalid data-objects.

According to some embodiments, and as shown in FIG. 3, accelerator 20 may be configured to copy data content of valid pages from read address space 210 to write address space 220, without consuming computational resources of host computer 10 (e.g. accelerator does not access host computer 10 and does not consume host computer 10 CPU cycles or memory space). For example, accelerator 20 may copy only valid data-objects from read address space 210 to write address space 220, without requiring computational resources from a processor of host computer 40.

Accelerator 20 may repeat reading data of PWUs into read address space 210, and copying valid data content therefrom to write address space 220 according to the GC command of GC module 430, until the amount of copied data in write address space 220 reaches a predefined threshold (e.g. when the amount of copied data content reaches the size, or storage capacity, of a PWU), or until a subsequent data object may not be accommodated within the remaining write address space 220.

According to some embodiments, when the amount of data content copied to the write address space reaches the predefined threshold, accelerator 20 may copy the content of write address space 220 and store it in at least one second PWU (e.g. 310-*c*) in NVM storage media 30, without addressing host computer 40, and without consuming computational resources of host computer 40.

According to some embodiments, GC module 430 may be configured to label or mark at least one first LWU that refers to the at least one first PWU (e.g. 310-*a*, 310-*b*) as free for new storage, and may mark at least one second LWU that refers to the at least one second PWU as occupied, as explained herein.

Figure 4:
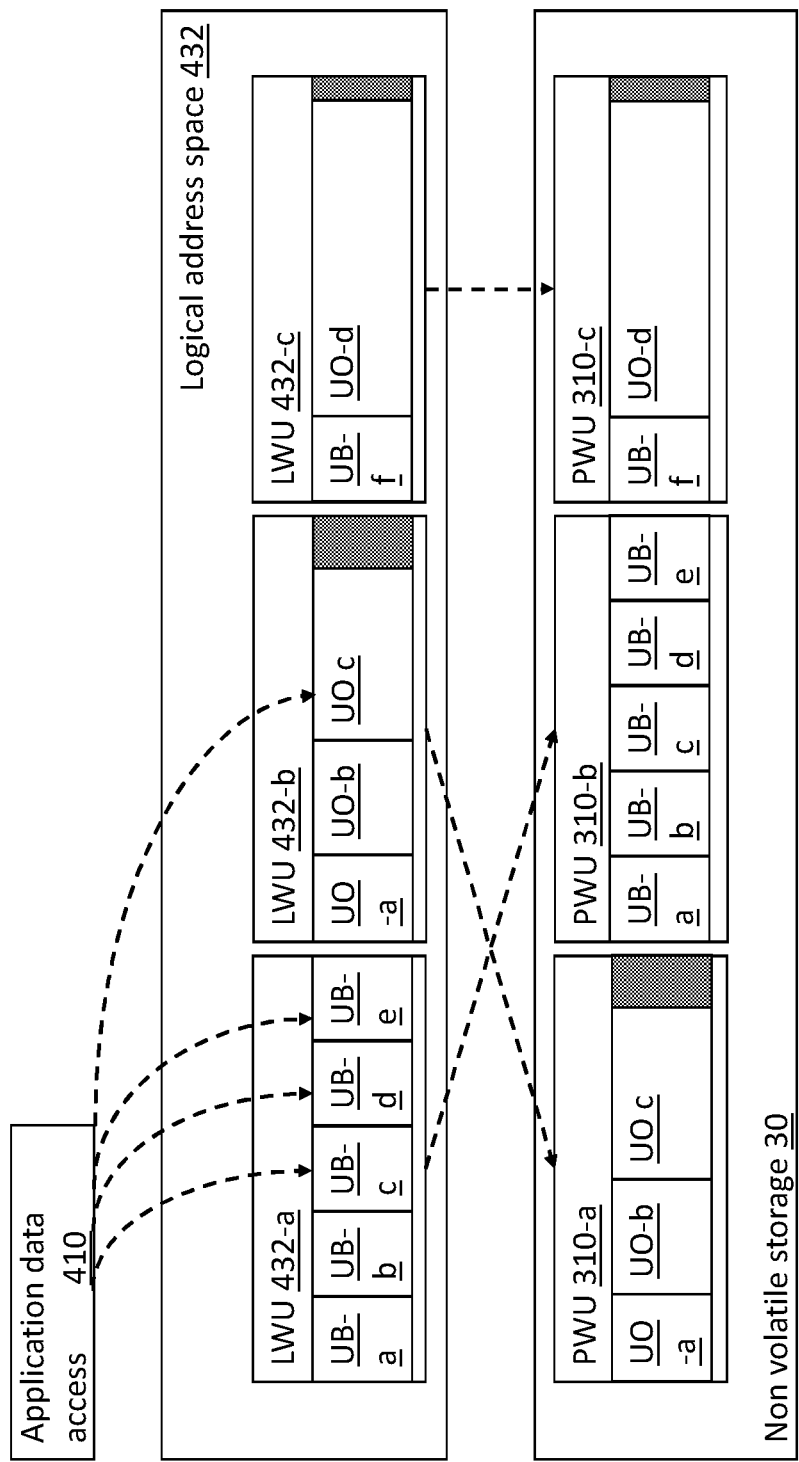
FIG. 4 is a block diagram, depicting an example of content of a logical address space according to some embodiments.

Reference is now made to FIG. 4 which is a block diagram, depicting an example for the content of the logical address space, which may be part of a system for accelerating GC, according to some embodiments.

According to some embodiments, logical address space 432 may be included within GC module (e.g. element 430 of FIG. 2). Additionally, or alternatively, logical address space 432 may be implemented as a separate module, on a memory space that may be separate from the memory of GC module 430.

As shown in FIG. 4, logical address space 432 may include a plurality of logical WUs (e.g.: LWU 432-*a*, LWU 432-*b*, LWU 432-*c*), each referring to, or associate with, a respective physical WU of NVM storage media 30 (e.g.: PWU 310-*b*, PWU 310-*a*, PWU 310-*c* respectively).

According to some embodiments, data-objects may be categorized according to at least two types: user blocks (UBs) and user objects (UOs).

UBs may be mapped into at least one fixed-sized logical address space (e.g.: UB-a, UB-b, UB-c, UB-d and UB-e) within an LWU (e.g. LWU 432-*a*), referring to at least one respective, fixed-sized, physical address space in a PWU (e.g.: PWU 310-*b*) of NVM storage media 30, including a plurality of contiguous data-pages of NVM storage media 30. For example, NVM 30 may store user blocks UB-a, UB-b, UB-c, UB-d and UB-e as fixed-sized objects in a relational database.

Application 410 running or being executed on a host computer (e.g. element 40 of FIG. 2) may be configured to access UB data-objects in the logical address space by providing an address including at least one of a combination of a namespace and an offset to an LWU address within the namespace. UOs may be mapped into at least one variable-sized logical address space (e.g. UO-a, UO-b, UO-c) within an LWU (e.g.: LWU 432-*b*). An LWU may refer to at least one respective, variable-sized physical address space in a PWU (e.g. PWU310-*a*) of NVM storage media 30, including a plurality of contiguous data-pages of NVM storage media 30.

For example, NVM 30 may store UO data objects as records in a key/value database, where each record may have a plurality of different fields, and where each field may, in turn, contain data of a different size. Application 410 running on a host computer (e.g. element 40 of FIG. 2) may be configured to access the UO data-objects in the logical address space by a key/value access protocol.

Embodiments of the system where GC is performed in quantities of WUs, provide flexibility in controlling the GC process for both fixed-sized data structures (e.g.: well determined user blocks within relational databases) and variable sized data structures (e.g. user objects stored in key/value databases, compressed data objects, etc.), or any combination thereof.

Figure 5:
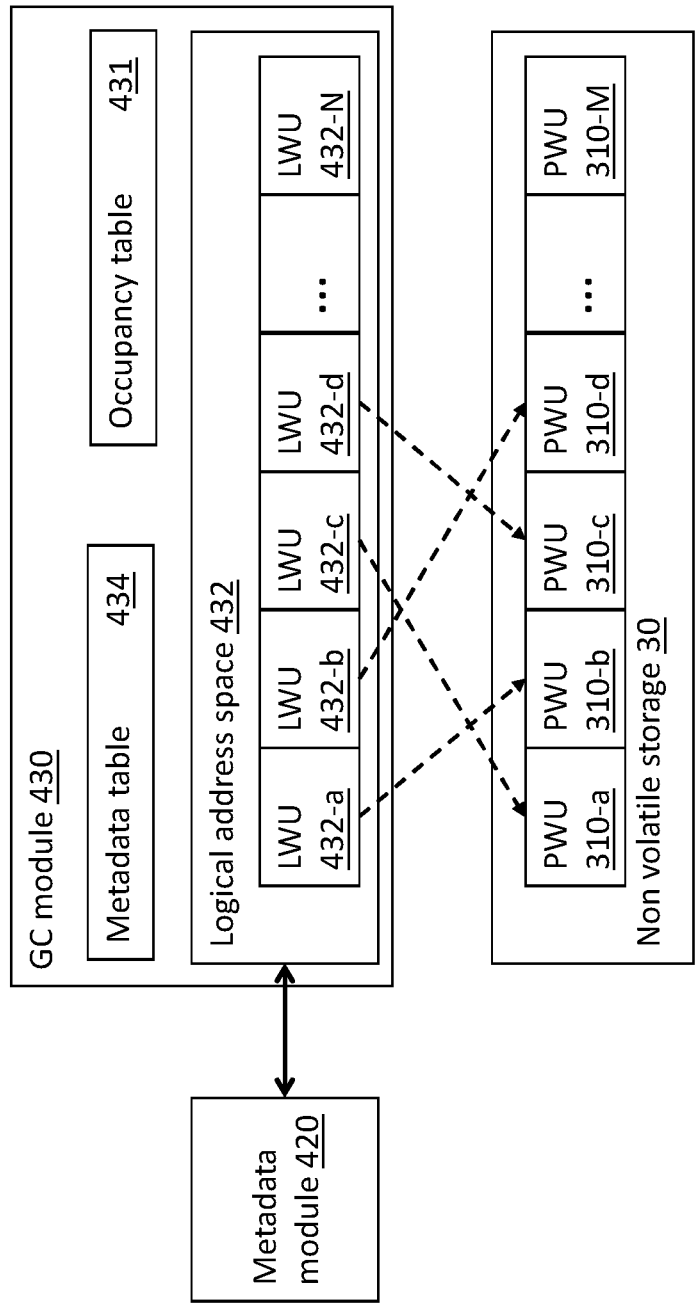
FIG. 5 is a block diagram depicting the content of a GC module, according to some embodiments.

Reference is now made to FIG. 5 which is a block diagram depicting the content of the GC module, which may be part of a system for accelerating GC, according to some embodiments;

According to some embodiments, GC module 430 may be configured to obtain a parameter of data validity of at least one data-object by performing a sequential scan of all the LWUs in logical address space, from the first LWU (e.g. LWU 432-*a*) to the last LWU (e.g. LWU 432-N) and wrap back to the first LWU in a cyclic pattern.

According to some embodiments, GC module 430 may be configured to obtain the parameter of data validity of at least one data-object (e.g. element UB-a, UB-b, UO-a of FIG. 4) mapped to a first LWU of the logical address space, according to the marking of metadata module 420. According to some embodiments, GC module 430 may maintain a metadata table 434, associating the parameter of data validity to the at least one data-object, and may continuously, repeatedly and/or periodically analyze the data in the metadata table, to extract a parameter of occupancy relating to at least one first LWU.

For example, the parameter of occupancy may be at least one of: (a) a number of valid data pages within an LWU, and (b) a percentage of valid data pages from the overall number of pages in an LWU. According to some embodiments, GC module 430 may maintain an occupancy table 431, associating a level of occupancy to at least one LWU of the logical address space 432.

For example, GC module 430 may be configured to count the number of valid data pages within an LWU, compare the number to a predefined occupancy threshold, and if the counted occupancy number (e.g. the number of valid pages) exceeds the occupancy threshold then: (a) mark the WU as occupied (b) disallow or prevent additional writing, or prevent writing to pages of that LWU; and (c) skip the LWU without sending a GC command, to avoid performing GC on a respective PWU.

According to some embodiments, if the occupancy number or level of an LWU is below the predefined occupancy threshold, GC module 430 may be configured to send a GC command to accelerator 20, to perform a GC process, as explained herein.

According to some embodiments, GC module 430 may receive at least one parameter or value that may be at least one of: an expected data-object size, an expected data-object write frequency, a required available space in NVM storage media 30, etc. GC module 430 may determine, based on the at least received parameter, whether or not performing a GC process is necessary at that time, and command accelerator 20 to act, or not command accelerator to act, accordingly.

For example, GC module 430 may determine that an occupancy parameter, level or value of a specific LWU is below a predefined occupancy threshold value or level. However, GC module 430 may also identify that the overall number of valid pages (e.g. the overall amount of data stored on NVM storage media 30) is lower than a predefined, minimal activity threshold. GC module 430 may conclude or select not to perform a GC process on the LWU, and not to send a GC command despite its low-occupancy (e.g. the occupancy being below a threshold), because system 1 may not be required to provide additional storage space at that time.

In another example, GC module 430 may selectively send a GC command to accelerator 20 to perform garbage collection based on at least one expected data-object size and an expected data-object write frequency: If the total rate of expected data to be written (e.g. multiplication of data-object size and write frequency) exceeds a predefined threshold, GC module may send a GC command to accelerator 20, to selectively perform a GC process. If the total rate of expected data to be written does not exceed this threshold, GC module will not send a GC command.

Figure 6A:
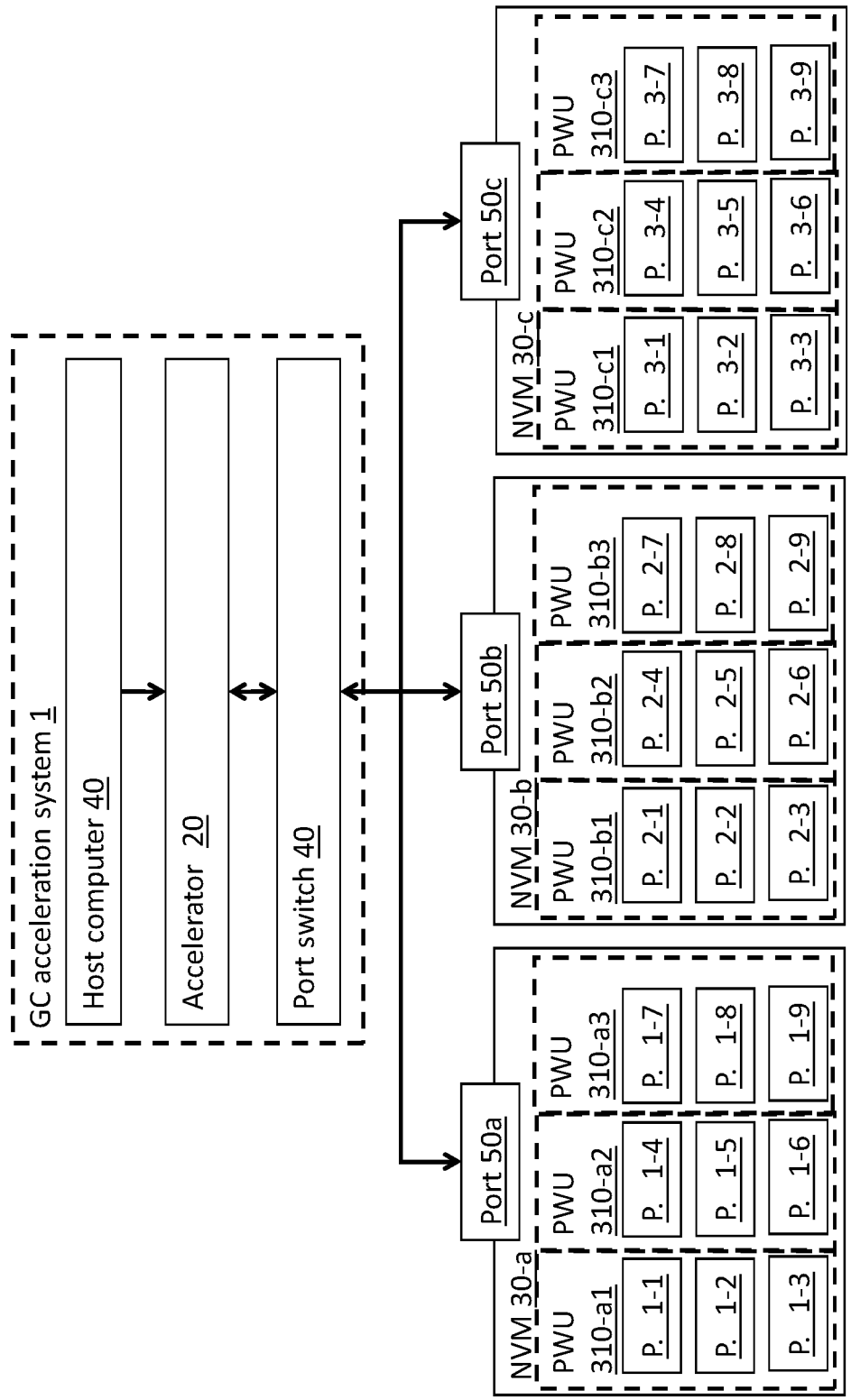
FIG. 6A and FIG. 6B are block diagrams depicting the operation of a system for GC acceleration, according to some embodiments.

Reference is now made to FIG. 6A, which is a block diagram depicting a system for GC acceleration, according to some embodiments. As shown in FIG. 6A, system 1 may be configured to interface, communicate or interact with a plurality of NVM media (e.g.: NVM30a, NVM30b, NVM30c) through a plurality of respective ports (e.g. Port 50a, Port 50b and Port 50c). For example, system 1 may be configured to control read and write operations to/from a plurality of SSD devices and accelerate GC operations on the plurality of SSD devices through a plurality of respective Peripheral Component Interconnect Express (PCIE) ports.

According to some embodiments, system 1 may include a port switch 40, configured to route data between system 1 and at least one port (e.g. 50a, 50b, 50c) of at least one NVM device of the plurality of NVM devices (e.g.: NVM30a, NVM30b, NVM30c). According to some embodiments, port switch 40 may be included within accelerator 20. Alternately, port switch 40 may be implemented as a separate hardware module, communicatively connected to accelerator 20.

According to some embodiments, port switch 40 may be configured to route at least one communication of data (e.g.: a data-read request, a data-read response, a write-request and a write response) between system 1 and at least one port (e.g. 50a, 50b, 50c) including, for example: a read request, a read response, a write request and a write acknowledgement.

The operation of system 1 in relation to each NVM device of the plurality of NVM devices may be substantially identical to its operation in relation to a single NVM media as described above, and will not be repeated here, for the purpose of brevity. However, according to some embodiments, the interface of host computer 40 to plurality of NVM devices NVM30a, NVM30b, NVM30c may enable accelerator 20 to perform GC across one or more NVM devices.

For example, GC module (e.g. element 430 of FIG. 5) may be configured to maintain a metadata table (e.g. element 434 of FIG. 5), associating data validity to data-objects, stored on at least two respective NVM devices (e.g.: NVM30a and NVM30b), and calculate the occupancy of PWUs whereupon the data-objects are stored. If the occupancy of a first PWU associated with a first NVM device is below a threshold, GC module 430 may order accelerator 20 to perform GC on the first PWU and copy valid data content from the first PWU to a second PWU that may be associated with a second NVM device.

Figure 6B:
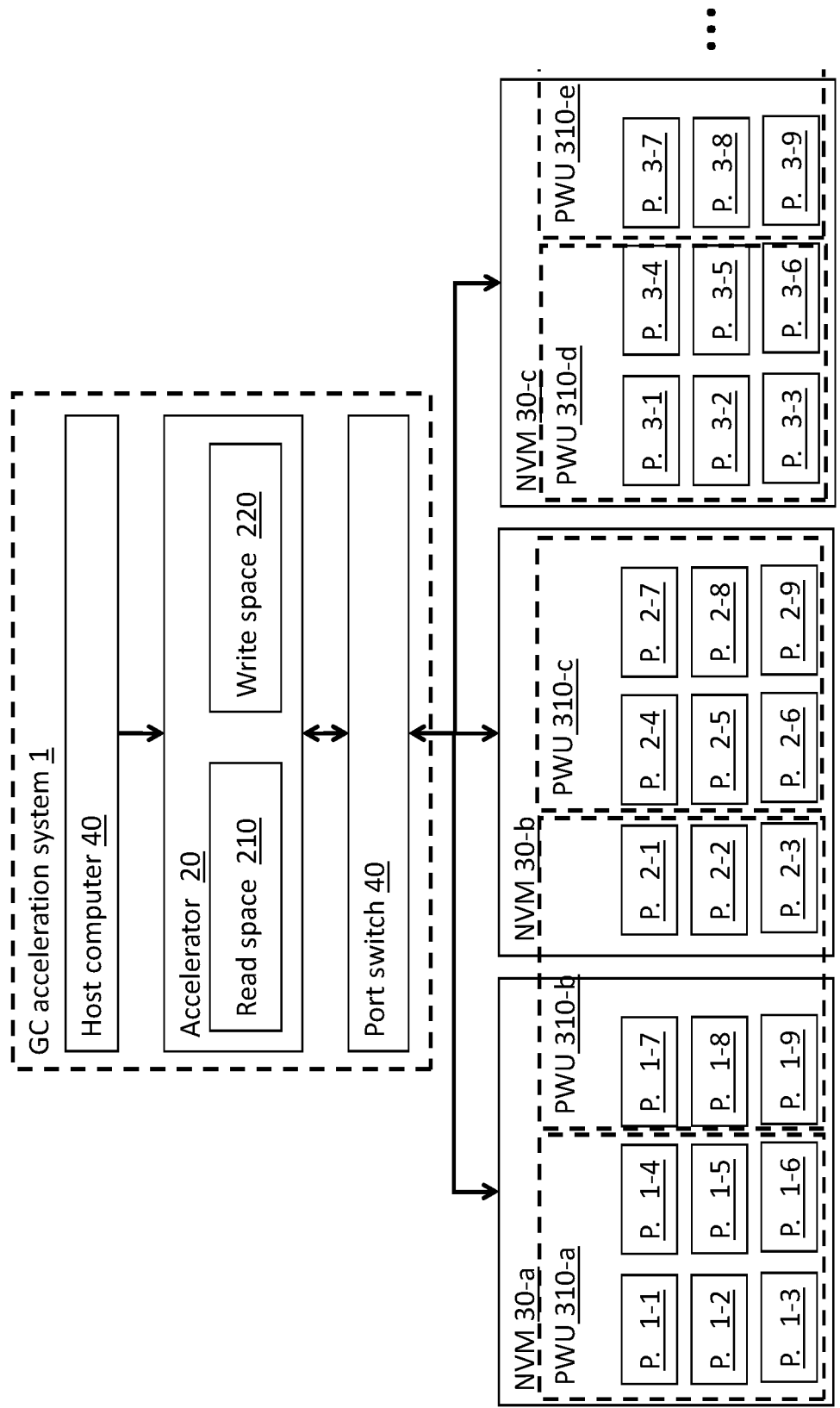

Reference is now made to FIG. 6B, which is a block diagram depicting a system for GC acceleration, according to some embodiments. As shown in FIG. 6B, PWUs 310-a thru 310-e may be associated with data-pages that are included in one or more NVM media. For example, PWU 310a, 310c and 310d are associated with data pages that are included in NVM30a, NVM30b and NVM30c respectively, whereas PWUs 310-b is associated with data pages that are included in both NVM30a and NVM30b.

Figure 7:
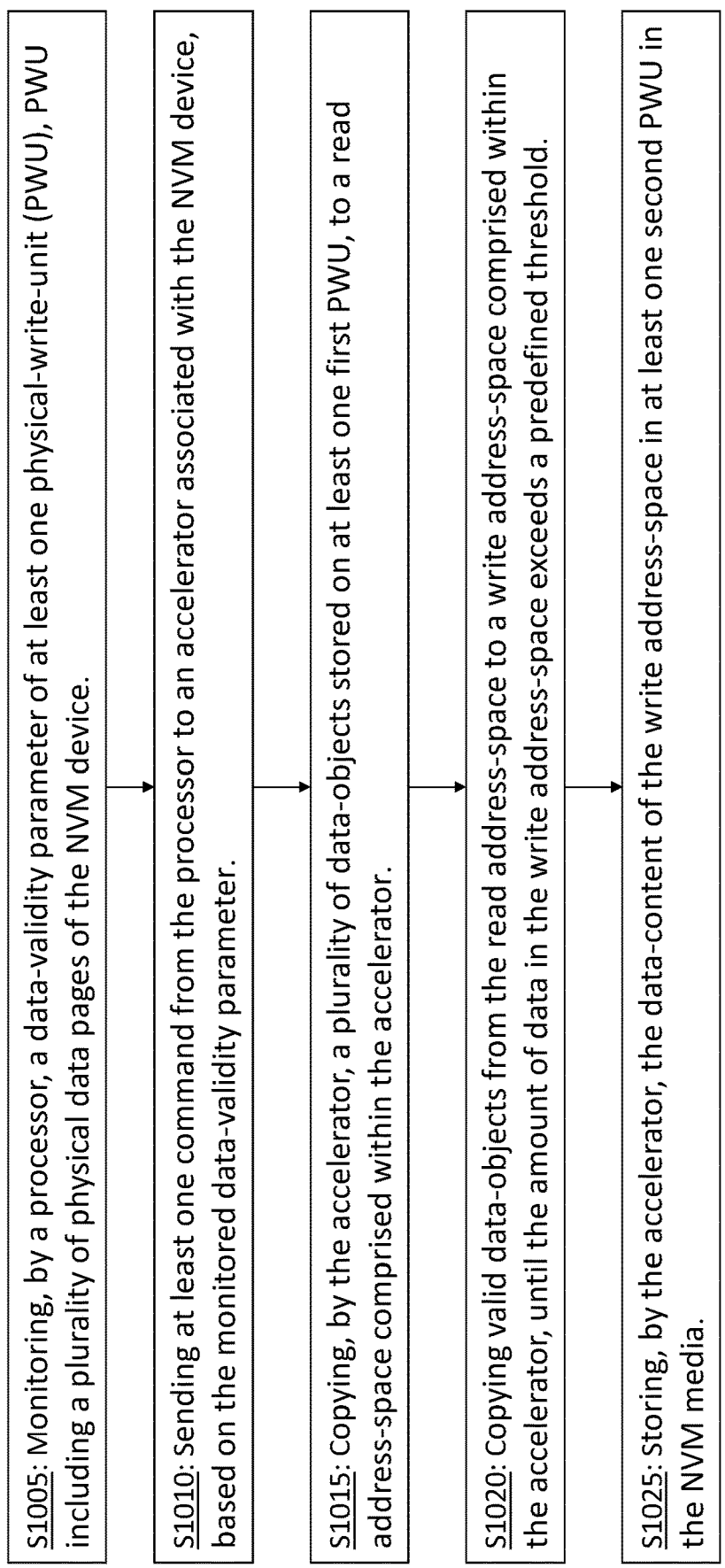
FIG. 7 is a flow diagram depicting a method for accelerating garbage collection on an NVM computer storage device according to some embodiments.

Reference is now made to FIG. 7 which is a flow diagram, depicting an example method for accelerating garbage collection on an NVM computer storage device associated with a host computer and an accelerator, according to some embodiments.

As shown by block S1005, at least one data validity parameter relating to at least one PWU may be monitored. For example: a data-object may be mapped to a logical address space within an LWU, that refers to the at least one PWU. A processor of a host computer may be configured to monitor a data validity parameter associated with the mapping of the data-object to the logical address space of the LWU.

As shown by block S1010, at least one GC command may be sent from the processor to an accelerator associated with the NVM device, commanding or requesting the accelerator to perform GC on at least one PWU, based on the monitored data validity parameter.

For example, the GC module (e.g. element 430 of FIG. 2) may be executed as a software process by the processor. GC module 430 may select to perform a garbage-collection process on at least one PWU, based on at least one value of data validity of data-objects mapped to at least one LWU referring to the at least one PWU. For example, GC may occur when a large number of data-objects in the LWU are marked as invalid: for example, if the number of data objects marked as invalid is over a threshold, a GC module may be executed, and if the number is less than or equal to the threshold, the GC module may not be executed.

GC module 430 may send such a selection as a GC command to accelerator 20. In embodiments where accelerator 20 is implemented as a computational device (e.g. element 100 of FIG. 1), separate from host computer (e.g. element 40 of FIG. 2), the GC command may be sent as a command from processor 105 of host computer 40 to accelerator 20 through any type of computer communication (e.g. over an Ethernet connection). In alternate embodiments, where GC module 430 and accelerator 20 are both implemented as software processes, executed by one or more processors 105 of host computer 40, the GC command may be sent as any type of message (e.g. an inter-process message), as known to persons skilled in the art of computer science.

As shown by blocks S1015, S1020 and S1025, accelerator 20 may receive the GC command, and, according to the command, consequently perform a process of garbage collection.

In block S1015, a plurality of data-objects stored on at least one first PWU may be copied to a read address space included within the accelerator. The read address space may be separate from the host computer, and the copying of data from the at least one first PWU may not require computational resources from the host computer.

As shown by block S1020, valid data-objects may be copied from the read address space to a write address space included within the accelerator until the amount of data in the write address space exceeds a predefined threshold. For example, data-objects that are marked as valid may be copied to the write address space, whereas data-objects that are marked as invalid (e.g. due to an overwrite or deletion of the data-object by an application running on the host computer) will be discarded.

As shown by block S1025, the data content of the write address space may be stored by the accelerator in at least one second PWU in the NVM media.

Other or different operations may be used.

Embodiments of the system for accelerating GC may improve the control of GC operations on NVM storage media 30, and improve data access of host computer 40 to the NVM 30:

On one hand, some embodiments handle GC on a logical address space level that is accessible, and controllable by for example accelerator module 20 and GC module 430. This is in contrast to GC operations that are handled in a physical address space and are not controllable by such software modules.

On the other hand, embodiments may perform a GC process in a manner that is detached from normal operation of host computer 40, do not require computational resources (e.g. CPU cycles, memory allocation) from host computer 40, and do not disrupt normal read and write access of host computer 40 to NVM 30.

Moreover, embodiments of the system where GC is performed in quantities of WUs may provide flexibility in controlling the GC process for both fixed-sized data structures (e.g. well determined user blocks within relational databases) and variable sized data structures (e.g. user objects stored in key/value databases, and/or compressed data objects), or any combination thereof.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for accelerating garbage collection (GC) on a non-volatile memory (NVM) computer storage media, comprising a host computer and an accelerator associated with the NVM media, wherein the host computer comprises a processor configured to:
monitor at least one parameter of data validity of at least one physical write unit (PWU), wherein each PWU comprises a plurality of contiguous physical data pages of the NVM media; and
send at least one GC command to the accelerator according to the at least one monitored parameter, based on the monitored data validity parameter;
and wherein the accelerator is configured to:
copy a plurality of data-objects stored on at least one first PWU, to a read address space comprised within the accelerator;
copy valid data-objects from the read address space to a write address space comprised within the accelerator, until the amount of data in the write address space exceeds a predefined threshold; and
store the data content of the write address space in at least one second PWU in the NVM media.

2. The system of claim 1, wherein the processor is further configured to:
define a logical address space, comprising at least one logical write units (LWUs), wherein each LWU refers to a respective PWU;
receive at least one data-object to be stored on the NVM media;
map the at least one data-object to a logical address space within a first LWU;
repeat the receiving of data-objects and mapping thereof into the first LWU until the first LWU cannot accommodate an additional data-object; and
store all data-objects that are mapped to the first LWU in a first PWU referred by the first LWU, on the NVM media.

3. The system of claim 2, wherein the host computer further comprises a metadata module, configured to:
monitor write-access operations of data-objects by the host computer to the NVM media; and
mark a mapping of at least one data-object to an address within an LWU as invalid based on at least one of a data-object overwrite operation and a data-object delete operation.

4. The system of claim 3, wherein the host computer comprises a GC module, configured to:
obtain a parameter of data validity of at least one data-object mapped to a first LWU of the logical address space, according to the marking of the metadata module;
maintain a metadata table, associating the parameter of data validity with the at least one data-object; and
analyze the metadata table, to extract a parameter of occupancy relating to the at least one first LWU.

5. The system of claim 4, wherein the GC module is configured to obtain a parameter of data validity of at least one data-object by performing a sequential scan of all the LWUs in the logical address space, from the first LWU to the last LWU, and wrap back to the first LWU in a cyclic pattern.

6. The system of claim 4, wherein if the occupancy of the at least one first LWU exceeds a first predefined threshold, then the GC module marks the LWU as occupied and prevent writing to pages of the at least one first LWU.

7. The system of claim 4, wherein if the occupancy of the at least one first LWU does not exceed the first predefined threshold, the GC module selectively causes the accelerator to perform a GC process according to at least one parameter.

8. The system of claim 7, wherein the accelerator comprises a read address space, and a write address space, and wherein performing a GC process by the accelerator comprises at least one of:
reading data content of at least one first PWU from the NVM media to the read address space, wherein the data content may contain data of valid and invalid pages;
copying data content of valid pages from the read address space to the write address space;
repeating the reading and copying of data content into the write address space until the amount of data content exceeds a second predefined threshold;
storing the data content in at least one second PWU in the NVM media; and
marking at least one first LWU that refers to the at least one PWU as free for new storage.

9. The system of claim 8, wherein the NVM media comprises a plurality of NVM devices, and wherein each NVM device is associated with at least one port, and wherein the system further comprises a port switch, configured to route data between the system and at least one port of at least one NVM device of the plurality of NVM devices.

10. The system of claim 9, wherein if the occupancy of a first PWU associated with a first NVM device is below a threshold, GC module orders accelerator 20 to copy valid data content from the first PWU to a second PWU that is associated with a second NVM device, thus performing GC across one or more NVM devices.

11. The system of claim 2, wherein the data-objects are mapped into at least one, fixed-sized logical address space within the first LWU, referring to at least one respective, fixed-sized physical address space in a PWU, and wherein the at least one second address space comprises a plurality of contiguous data-pages of the NVM media.

12. The system of claim 11, wherein the host computer is further configured to access data-objects in the logical address space by providing an address comprising a combination of a namespace and an offset to an LWU address within the namespace.

13. The system of claim 2, wherein the data-objects are mapped into at least one, variable-sized logical address space within the first LWU, referring to at least one respective, variable-sized physical address space in a PWU, and wherein the at least one physical address space comprises a plurality of contiguous data-pages of the NVM media.

14. The system of claim 13, wherein the host computer is further configured to access data-objects within the logical address space by a key/value access protocol.

15. A method for accelerating garbage collection on an NVM computer storage device, the method comprising:
monitoring, by a processor, a data validity parameter of at least one PWU, wherein each PWU comprises a plurality of physical data pages of the NVM device;
sending at least one GC command from the processor to an accelerator associated with the NVM device, based on the monitored data validity parameter;
copying, by the accelerator, a plurality of data-objects stored on at least one first PWU, to a read address space comprised within the accelerator;
copying valid data-objects from the read address space to a write address space comprised within the accelerator until the amount of data in the write address space exceeds a predefined threshold; and
storing, by the accelerator, the data content of the write address space in at least one second PWU in the NVM media.

16. The method of claim 15, wherein the accelerator is associated with a plurality of NVM devices, and wherein if an occupancy of a first PWU associated with a first NVM device is below a threshold, the accelerator copies valid data content from the first PWU to a second PWU that is associated with a second NVM device, thus performing GC across one or more NVM devices.

17. A method for accelerating garbage collection on an NVM computer storage media associated with a host computer and an accelerator, the method comprising:
defining, by the host computer, a logical address space, comprising at least one LWU, wherein each LWU refers to a respective PWU;
receiving, by the host computer, at least one data-object to be stored on the NVM media;
mapping by the host computer, the at least one data-object to a logical address space within an LWU;
repeating the receiving of data-objects and mapping thereof into the LWU until the LWU cannot accommodate an additional data-object storing all data-objects that are mapped to the LWU in a first PWU referred by the first LWU, on the NVM media;
monitoring, by the host computer, at least one parameter of data validity in relation to at least one PWU, wherein each PWU comprises a plurality of contiguous physical data pages of the NVM media;
sending at least one GC command from the host computer to the accelerator according to the at least one monitored parameter; and
performing GC by the accelerator on the at least one PWU according to the at least one GC command of the host computer.

18. The method of claim 17, further comprising:
monitoring write-access operations of data-objects by the host computer to the NVM media by a metadata module comprised within the host computer; and
marking, by the metadata module, a mapping of at least one data-object to an address within an LWU as invalid based on at least one of a data-object overwrite operation and a data-object delete operation.

19. The method of claim 18, further comprising:
obtaining, by a GC module comprised within the host computer, a parameter of data validity of at least one data-object mapped to a first LWU of the logical address space, according to the marking of the metadata module;
maintaining, by the GC module, a metadata table, associating the parameter of data validity to the at least one data-object;
analyzing the metadata table by the GC module, to extract a parameter of occupancy relating to the at least one first LWU.

20. The method of claim 19, further comprising: performing a sequential scan of all the LWUs in logical address space by the GC module, from the first LWU to the last LWU, and wrapping back to the first LWU in a cyclic pattern, and obtaining a parameter of data validity of at least one data-object in at least one scanned LWU.

21. The method of claim 19, wherein if the occupancy of the at least one first LWU exceeds a first predefined threshold, then marking the WU as occupied by the GC module and preventing writing to pages of the at least one first LWU.

22. The method of claim 19, further comprising: if the occupancy of the at least one first LWU does not exceed the first predefined threshold, then sending a GC command from the GC module to the accelerator and causing the accelerator to selectively perform a GC process according to at least one parameter.

23. The method of claim 22, wherein performing a GC process by the accelerator further comprises at least one of:
reading data content of at least one first PWU from the NVM media to a read address space comprised within the accelerator, wherein the data content may contain data of valid and invalid pages;
copying data content of valid pages from the read address space to a write address space comprised within the accelerator;
repeating the reading and copying of data content into the write address space until the amount of data content exceeds a second predefined threshold;
storing, by the accelerator, the data content in at least one second PWU in the NVM media; and
marking, by the accelerator, at least one first LWU that refers to the at least one PWU as free for new storage.

24. The method of claim 17, wherein the data-objects are mapped by the host computer into at least one, fixed-sized logical address space within the first LWU, referring to at least one respective, fixed-sized physical address space in a PWU, and wherein the at least one second address space comprises a plurality of contiguous data-pages of the NVM media.

25. The method of claim 24, further comprising accessing data-objects in the logical address space by the host computer, by providing an address comprising a combination of a namespace and an offset to an LWU address within the namespace.

26. The method of claim 17, wherein the data-objects are mapped by the host computer into at least one, variable-sized logical address space within the first LWU, referring to at least one respective, variable-sized physical address space in a PWU, and wherein the at least one physical address space comprises a plurality of contiguous data-pages of the NVM media.

27. The method of claim 24, further comprising accessing data-objects in the logical address space by the host computer, by a key/value access protocol.

* * * * *